United States Patent [19]
Sprain

[11] 3,811,271
[45] May 21, 1974

[54] COMBUSTION ENGINE APPARATUS HAVING COMPRESSION CYLINDERS AND POWER CYLINDERS

[76] Inventor: Edward F. Sprain, 1070 N. 99th Ave., Space 16, Sun City, Ariz. 85351

[22] Filed: Sept. 20, 1973

[21] Appl. No.: 398,949

[52] U.S. Cl.............. 60/39.6, 60/39.68, 219/206
[51] Int. Cl............................................ F02g 3/02
[58] Field of Search............. 60/39.68, 39.6–39.63, 60/39.82 N, 39.82 S; 219/206, 207, 205

[56] References Cited
UNITED STATES PATENTS

| | | | |
|---|---|---|---|
| 1,074,209 | 9/1913 | Roy | 60/39.68 X |
| 1,601,248 | 9/1926 | Gillespie et al. | 60/39.68 X |
| 1,015,411 | 1/1912 | Webb | 60/39.82 N |
| 3,482,395 | 12/1969 | Rando et al. | 60/303 X |
| 3,672,160 | 6/1972 | Kim | 60/39.68 X |

Primary Examiner—Carlton R. Croyle
Assistant Examiner—Robert E. Garrett
Attorney, Agent, or Firm—H. Gordon Shields

[57] ABSTRACT

External combustion engine apparatus is disclosed which includes compression cylinders for compressing a fuel-air mixture from a carburetor and separate power cylinders which receive combustion gases under relatively high pressure and derive power therefrom. Between the compression cylinders and the power cylinders are combustion chambers, which receive the compressed fuel air mixture and in which ignition and combustion takes place, and a pressure accumulator which receives the combusted gases from the combustion chambers. From the pressure accumulator the gases flow into the power cylinders.

6 Claims, 4 Drawing Figures

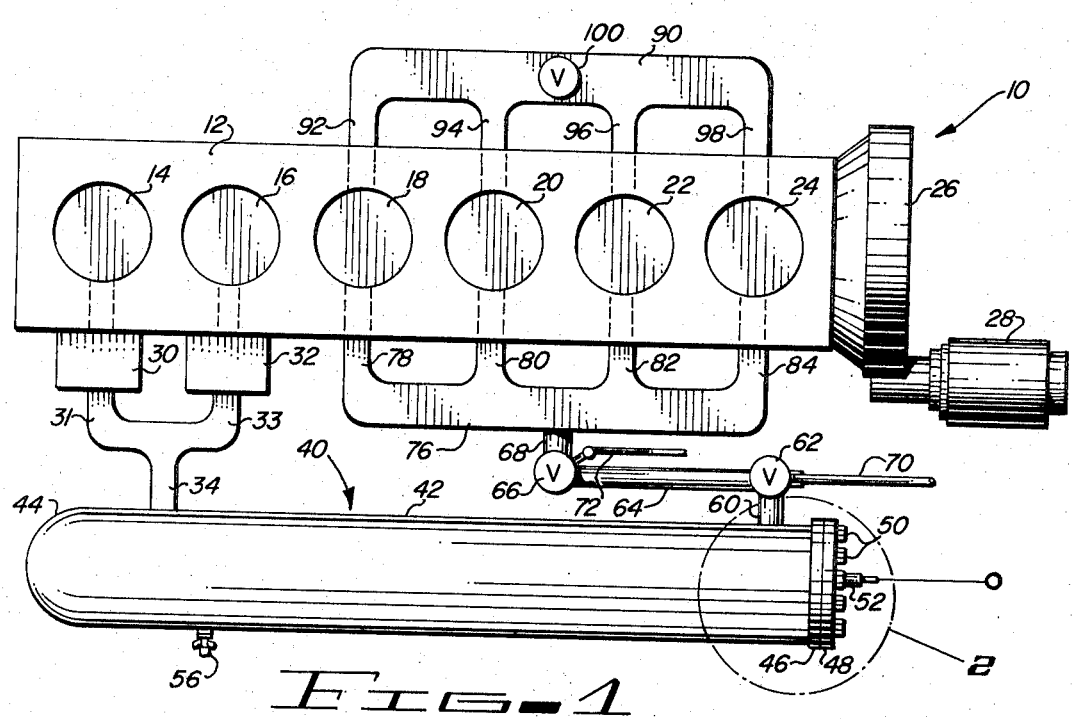
Fig-1
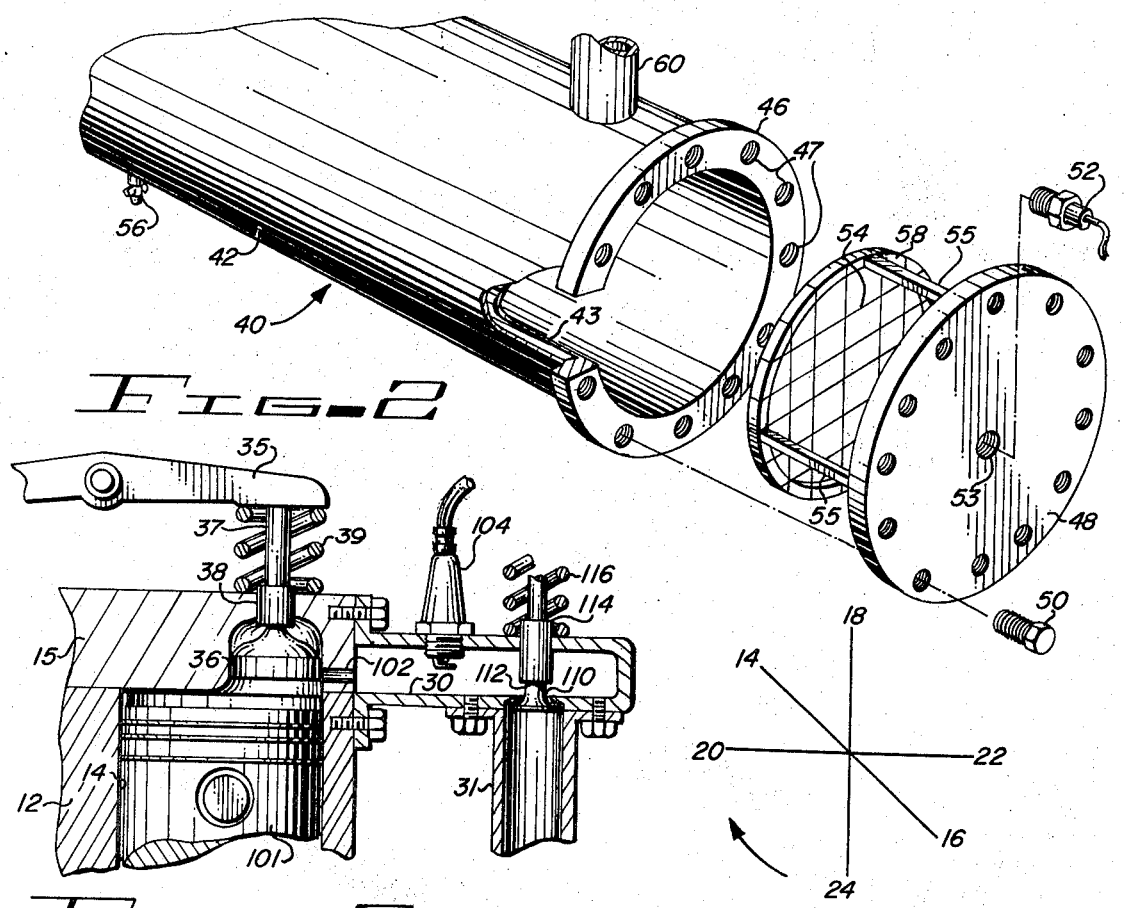
Fig-2
Fig-3
Fig-4

COMBUSTION ENGINE APPARATUS HAVING COMPRESSION CYLINDERS AND POWER CYLINDERS

BACKGROUND OF THE INVENTION

1. Field of the Invention

This invention relates to external combustion engines and, more particularly, external combustion engines in which separate cylinders are provided for compression and for power. The compression cylinders serve only to compress a gaseous mixture, and combustion takes place externally of the compression cylinders. The gases from the combustion of the fuel-air mixture flow into the power cylinders from which power to drive the engine is derived. The power cylinders also provide power to compress the fuel-air mixture in the compression cylinders.

2. Description of the Prior Art

Combustion engines of many types have been developed in the last hundred years. The most used of the internal combustion engine type are perhaps the four-stroke cycle engines which are used to power most of the automobiles and many of the small implements, such as lawn mowers, compressors, cement mixers, and the like. The diesel engine is also very popular in producing power for large vehicles, such as trucks, buses, construction equipment, and the like. Two-stroke cycle engines are also relatively popular, primarily for providing power for small vehicles, such as motorcycles, and also some automobiles.

Rotary combustion chamber engines, such as the Wankel engine, are increasing in popularity as their reliability increases.

External combustion engines have not proven popular over the years, as compared with internal combustion engines. Hence, development has lagged, but is being reconsidered as an alternate to the internal combustion engine in an effort to reduce pollution.

In recent years the desire on the part of everyone to reduce pollution emitted from engines has focused attention on the pollution aspect of engines. Along with this attention has come the attempts to reduce pollution, such as carbon monoxide, nitrous oxides, and other products of combustion. Attention has also been given to the development of engines which will run without lead additives, which in bygone years have been increasingly important due to the increase in the compression ratios of the engines.

A universal desire for clean air has thus focused the attention and efforts of automotive engineers on developing and producing engines in which combustion can take place substantially completely which will eliminate much of the pollution problem.

The external combustion engine herein described and claimed provides for substantially complete combustion and accordingly reduces the pollutants emitted by the engine into the atmosphere.

SUMMARY OF THE INVENTION

This invention comprises a combustion engine in which there is a separation between the compression of a gaseous charge, the combustion of the gaseous charge, and the power derived from the combustion of the gaseous charge. Compression cylinders serve to compress a gaseous mixture of fuel and air from a carburetor, and the compressed mixture flows to a combustion chamber where the compressed charge is ignited. An automatic valve, preset to open at a predetermined pressure, allows the combusted and expanded gaseous mixture to flow into a pressure accumulator, where further combustion takes place by means of an electrically heated grid. The electrically heated grid provides increased temperatures to insure that the fuel and air mixture is completely combusted. The pressure thus accumulated is then transferred to a power cylinder section where power is derived from the gases.

Among the objects of this invention are the following:

to provide a new and useful combustion engine;
to provide a new and useful combustion engine having separate compression and power cylinders;
to provide a new and useful engine in which combustion takes place externally of the compression cylinders;
to provide a new and useful engine in which pressure from the combustion of a fuel-air mixture is accumulated for later use;
to provide new and useful combustion engine apparatus in which the gaseous products of combustion are transferred from a pressure accumulator to power cylinders for the utilization of the gaseous products.

BRIEF DESCRIPTION OF THE DRAWING

FIG. 1 is a schematic representation of engine apparatus embodying the present invention.

FIG. 2 is a partially exploded view of a portion of the apparatus of FIG. 1.

FIG. 3 is a sectional view of a portion of the apparatus of FIG. 1.

FIG. 4 is a schematic representation of the crank arrangement of apparatus embodying the present invention.

DESCRIPTION OF THE PREFERRED EMBODIMENT

FIG. 1 is a schematic view of external combustion engine apparatus including the present invention. External combustion engine apparatus 10 includes a block 12 having six cylinders, compression cylinders 14 and 16 and power cylinders 18, 20, 22, and 24. Shown at one end of the block 12 is a fly wheel 26 and starter motor apparatus 28. The starter motor is shown engaged with the fly wheel 26.

The six cylinders are connected together on a single crank shaft and are each the same size, with respect to the bore and stroke of their pistons and accordingly of the displacement of each of the cylinders. In cylinders 14 and 16, compression of a fuel air mixture from a conventional carburetor takes place. From the compression cylinders 14 and 16 the compressed fuel air mixture is transmitted respectively to a pair of combustion chambers 30 and 32, which are external of the block. A manifold 31 and a manifold 33 connect respectively to combustion chambers 30 and 32 and extend to a manifold 34 through which the hot burned and expanding gases flow from the combustion chambers to a pressure accumulator 40. The manifolds 31, 33, and 34 are in the configuration of a "Y" with the manifolds 31 and 33 comprising the arms of the "Y" and manifold 34, to which they are connected, comprising the stem of the "Y." Thus, a fuel air mixture is introduced into compression cylinders 14 and 16 where the mixtures are compressed and then sent to external combustion chambers 30 and 32 where combustion takes place. From combustion chambers 30 and 32 the hot burned gases flow through manifolds 31, 33 and 34 into a pressure accumulator 40. It is obvious that appropriate valve apparatus are required in the cylinders, in the combustion chambers, and in the pressure accumulator apparatus. Some of the valves will be discussed in detail below.

Within the pressure accumulator 40, the hot gases are further combusted, as required, by being subjected to a hot grid within the accumulator. The grid will be discussed in detail in conjunction with FIG. 2, below.

The pressure accumulator apparatus 40 comprises preferably a double walled elongated accumulator cylinder 42, having a rounded end 44 adjacent the manifold 34. At the opposite one of the cylinder 42 from the end 44 is a radially outwardly and circumferentially extending flange 46. An end closure plate 48 is sealingly secured to the flange 46 by appropriate fastening means 50, which may be bolts, as shown. The end closure plate 48 serves a dual purpose, one of which is to sealingly close the cylinder 42 and the other is to support an electrically heated grid within the cylinder 42. The grid is connected to a source of electrical power through a hot plug 52.

A system of conduits or manifolds and valves is employed between the accumulator and the pressure cylinders for transferring the burned and expanded gases from the pressure accumulator apparatus to the power cylinders. A conduit or manifold 60 is connected to the accumulator apparatus 40, and extends to a starter valve 62 which is one of a pair of valves inserted in the manifold system between the pressure accumulator apparatus and the power cylinders. The purpose of valve 62 is to act as a start-stop valve to control the flow of the pressure from the accumulator to the power cylinders. With the valve in the open position, pressure flows through manifold 60 into another manifold 64. Thus in order to start the engine, valve 62 must be placed in the open position. With the valve in the closed position, pressure does not flow through manifold 60 into manifold 64 and accordingly the engine shuts off.

An accelerator valve 66 is connected to manifold 64. The valve 66 controls the amount or rate of flow of the pressure from the accumulator to the power cylinders. The valve 62 is controlled by appropriate linkage 70, and valve 66 is controlled by appropriate linkage 72. With valve 62 open, by means of linkage 70, the engine apparatus will run providing there is sufficient pressure in accumulator apparatus 40 to provide pressure to operate the power cylinders.

The speed of the engine will vary according to the setting of valve 66, which is operated by the appropriate linkage 72. If desired, valve 66 may also be used as an idle valve to provide sufficient pressure at idling speeds to continue the operation of the engine. As an alternative, a by-pass manifold may be used to provide adequate pressure flow for idling.

Another manifold 68 extends between valve 66 and a pressure distribution manifold 76. The pressure distribution manifold 76 includes four manifold runners 78, 80, 82, and 84, which are respectively connected to power cylinders 18, 20, 22 and 24. Thus the flow of pressure from pressure accumulator apparatus 40 is through manifold 60, valve 62, manifold 64, valve 66, and manifold 68 into distribution manifold 76 and from the distribution manifold into the respective power cylinders by the manifold runners 78, 80, 82, and 84.

In operation, assuming there is sufficient pressure in the pressure accumulator apparatus 40, when linkage 70 is moved to the on position, valve 62 is open and pressure flows from cylinder 42 through manifolds 60 and 64 to valve 66. With valve 66 in the idling position, sufficient pressure will flow through the valve and through manifold 68 into the pressure distribution manifold 76 and thence through runners 78, 80, 82, and 84 into pressure cylinders 18, 20, 22, and 24, respectively, according to the timing sequence of the engine, which will be discussed in detail below. With pressure thus flowing into the pressure cylinders, the pressure within the cylinders moves against pistons therein to provide power to a crankshaft. Compression cylinders 14 and 16 are also connected to the crankshaft, which is well known in the art, and accordingly not illustrated specifically herein. As the crankshaft moves, pistons within compression cylinders 14 and 16 also move and gaseous charges of fuel and air are inducted into the compression cylinders by appropriate carburetor and intake manifold apparatus.

When pressure builds up to a predetermined level within the compression cylinders, the compressed fuel-air mixture is sent to external combustion chambers 30 and 32, where the compressed fuel-air mixture is ignited and combusted. When pressure within the combustion chambers reaches an appropriate predetermined amount, again appropriate valve action takes place to allow the hot expanded gases to flow through manifold 31, 33, and 34 into the pressure accumulator apparatus 40. The output of compression cylinders 14 and 16 is sufficient to supply adequate pressure for the power cylinders. Any excess pressure, over a predetermined amount, will escape through a drain/safety valve 56 secured to cylinder 42.

If there is not sufficient pressure in the pressure accumulator apparatus 40 to start the engine, it is then necessary to use starter motor 28 which is connected to flywheel 26 and thence to the crankshaft of the engine. Upon starting the engine, only compression cylinders 14 and 16 are required until sufficient pressure builds up within pressure accumulator apparatus 40 to provide adequate pressure for the power cylinders. Accordingly, it is highly desirable to reduce the drag of the power cylinders during the initial starting procedure. For this purpose, a separate manifold and valve arrangement is used.

During this starting procedure, starting valve 62 and accelerator valve 66 will both be in a closed position, which will allow pressure to build up within the cylinder 42. Manifold 90, with runners 92, 94, 96, and 98 extending respectively to the power cylinders 18, 20, 33, and 24, is operable to reduce drag on the power cylinders through a valve 100. The valve 100 is a spring loaded valve which is normally open, thus allowing atmospheric pressure to flow through manifold 90 and through its runners to the respective cylinders. With atmospheric pressure communicated to the power cylinders, there will be no drag on the engine due to a pressure build up within the cylinders during the cranking of the engine when the normal valve arrangement of the power cylinders would be such as to provide a drag during the cranking of the engine.

After sufficient pressure has built up within the cylinder 42, the start valve 62 may be opened and also accelerator valve 66, as desired. Pressure will accordingly flow into the power cylinders. With pressure on the cylinders, the pressure will also be transmitted through the runners 92, 94, 96, and 98, and manifold 92, to valve 100, which will thus close the valve 100. The valve 100 will be held closed as long as there is pressure on the engine apparatus during operation.

As may be well understood, the embodiment of the present invention utilizes a six cylinder block, which is very common and well known in the engine art. However, the engine would require a different crankshaft from typical six cylinder internal combustion engines. With respect to the valves, the intake valves of the compressor cylinders and the exhaust valves of the power cylinders are substantially the same as is typical in such six cylinder engines, but the other valves of the compressor and power cylinders are special. The external combustion chambers would be added to the block, along with other apparatus. The manifold apparatus 90, with its runners and its valve, may be secured to the engine at the spark plug openings. Accordingly, a typical six cylinder block may be used with very little modification in the present engine.

FIG. 2 is an enlarged exploded view of a portion of the apparatus of FIG. 1, namely a portion of the pressure accumulator apparatus 40. Cylinder 42, which may be considered as an outer wall, is shown with its inner wall 43 spaced apart therefrom. The space between the walls of the cylinder may be used for the circulation of a cooling medium. The flange 46 extends circumferentially around an end of the cylinder 42 and is connected to both the outer wall and the inner wall. A plurality of appropriately spaced and internally threaded bolt holes 47 extend through the flange. The bolt holes receive the fasteners 50, which secure the end closure plate 48 to the cylinder 42. Appropriate gaskets, or other sealing means, may be required, and are well known in the art.

A hot plug 52 is received in a threaded aperture 53 which extends through the end closure plate 48 to supply power to an electric grid 54. The grid 54 is supported within the cylinder 42 by a plurality of studs 55 which are secured to the end plate 48 and by a ring 58 which is secured to the studs 55. The studs 55 comprise spacers which support the ring 58 within the pressure accumulator apparatus 40 beyond the manifold 60. Accordingly, with the end closure plate 48 secured to the flange 46, and the grid 54 extends within the cylinder beyond the manifold 60 so that the flow of gases or pressure from within the accumulator apparatus outwardly through the manifold 60 and thence to the power cylinders must pass through the grid 54. With appropriate engine ignition in the "on" position, the power from an electrical system is supplied to the grid 54 through hot plug 52. The flow of current through the grid 54 results in the heating of the grid which in turn provides sufficient heat within the accumulator to continue the combustion process for any incompletely combusted material. This in turn results in substantially complete combustion of the fuel air mixture introduced into the engine through the carburetor system. For any unburned gases, or fuel air mixture, which were not completely combusted within the combustion chambers will accordingly be subjected to the heat of the grid system and will accordingly be substantially completely combusted. This in turn results in the low quantities of pollutants emitted from the present engine.

Extending beneath the cylinder 42 is a drain and safety valve 56. Any water which condenses within the cylinder apparatus may be drained through the drain valve 56. Also incorporated with the drain is a safety valve which opens at a predetermined pressure to prevent an excess build-up of pressure within the accumulator apparatus 40. If desired, separate valves could be provided to perform the drain and safety functions.

FIG. 3 is a view in partial section of a portion of the apparatus of FIG. 1 showing compression cylinder 14 and its combustion chamber 30. Cylinder 14 extends into a cylinder head 15, and a rocker arm 35 actuates a valve 36 within the cylinder head 15. The valve 36 is connected to a valve stem 37 which extends through a sleeve 38 in the cylinder head between the valve and the rocker arm. A compression spring 39 extends about the valve stem 37 between the cylinder head 15 and the rocker arm 35. The rocker arm 35 holds the valve 36 in the down position while a fuel air mixture is being compressed within cylinder 14 by the upward movement of piston 101. As the compression stroke is being completed as shown in FIG. 3, the valve 36 is moved upwardly to allow the fuel air mixture to flow through port 102 into the external combustion chamber 30. The combustion chamber 30 is appropriately secured by well known fastening means to the cylinder head 15. As is well known and understood in the art, appropriate cooling means such as circulating fluids, are required for the cylinder head and combustion chamber. Such cooling means have been omitted for purposes of clarity.

A spark plug 104 extends into the combustion chamber 30 and provides a spark at the appropriate time which results in the ignition and thus the combustion of the compressed fuel air mixture within the chamber. After the fuel air charge has been delivered into the combustion chamber, the valve 36 closes the port 102 and the piston 101 moves downwardly and a fresh charge is introduced by appropriate valve means into the cylinder 14. The movement of the piston thus produces a compression stroke on each upward movement, or two compression strokes per revolution of the engine.

From combustion chamber 30, the combusted charge of hot gases flowes into manifold 31 when valve 110 opens. Valve 110 is a poppet valve which opens automatically when the pressure within chamber 30 reaches a predetermined level. As is well known in the art, a sleve 114 extends through a wall of the combustion chamber 30. Movement of valve 110, by its valve stem 112, is governed by the spring pressure of compression spring 116, and its movement is opposed by compression spring 116. The operation of the valve, through its valve stem and the spring, are well known in the art. Accordingly, when the pressure within the cylinder builds to a predetermined amount, valve 110 opens automatically to allow pressure, in the form of hot expanded gases from combustion chamber 30, to flow through manifold 31 into the pressure accumulator apparatus 40 (see FIG. 1).

FIG. 4 is a schematic representation of the crankshaft and of the arrangement of the compression cylinders and the power cylinders. Compression cylinders 14 and 16 are 180° apart, and the power cylinders are 90° apart. The compressor pistons are at 45° to the power pistons. Rotation of the crankshaft is shown by the large arrow. The cam shaft for operating the valves for the cylinders will rotate at the same speed as the crankshaft, and the timing gears will operate on a one to one ratio.

For the compressor pistons and cylinders, the compressor cycle is such that the intake valve opens at about 6° past top dead center (TDC) and closes at about 175° past TDC. The exhaust valve opens at about 210° past TDC and closes at about 6° before TDC. For the power pistons and cylinders, the power cycle is such that the inlet valve opens at about 6° before TDC and closes at about 60° past TDC. The exhaust valve opens at about 174° past TDC and closes at about 18° before TDC. For combustion, ignition of the fuel air mixture in the combustion chambers is accomplished by the firing of the spark plugs at about 24° past TDC.

The external combustion engine thus disclosed provides substantially complete combustion of an air-fuel mixture by the apparatus disclosed, including the hot grid in the pressure accumulator for secondary combustion. In addition to the apparatus disclosed, other accessories may be used as required. For example, an appropriate pressure gage may be connected to the pressure accumulator to indicate to an operator the amount of pressure available. Moreover, carburetor mixture adjusting apparatus may be incorporated to control the gain of the pressure.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. External combustion engine apparatus, comprising, in combination:
    compression cylinder means for receiving and compressing a charge of fuel and air;
    combustion chamber means adjacent the compression cylinder means for receiving a compressed charge of fuel and air from the compression cylinder means;
    means for igniting and combusting the compressed charge of fuel and air in the combustion chamber means to provide a quantity of pressurized gases;
    pressure accumulator means for receiving and storing the quantity of pressurized gases from the combustion chamber means;
    first valve means for controlling the flow of pressurized gases between the combustion chamber means and the pressure accumulator means;
    power cylinder means for receiving the pressurized gases from the pressure accumulator means;
    second valve means for controlling the flow of pressurized gases from the pressure accumulator means to the power cylinder means; and
    heated grid means in the pressure accumulator means through which the pressurized gases flow between the pressure accumulator means and the power cylinder means for providing further ignition and combustion of fuel and air in the pressurized gases.

2. The apparatus of claim 1 in which the first valve means includes a spring loaded poppet valve actuable at a predetermined pressure to provide a flow of pressurized gases from the combustion chamber means to the pressure accumulator means.

3. The apparatus of claim 2 in which the grid means includes a hot plug for providing a source of electrical power for heating the grid.

4. The apparatus of claim 3 in which the second valve means includes a pair of valves for controlling the flow of pressurized gases between the pressure accumulator means and the power cylinder means.

5. The apparatus of claim 4 in which the power cylinder means includes third valve means for admitting atmospheric pressure to the power cylinder means.

6. the apparatus of claim 5 in which the compression cylinder means and the power cylinder means include a common crankshaft.

* * * * *